No. 839,001. PATENTED DEC. 18, 1906.
D. E. JONES.
MACHINE BELTING.
APPLICATION FILED DEC. 21, 1905.
Fig.1.
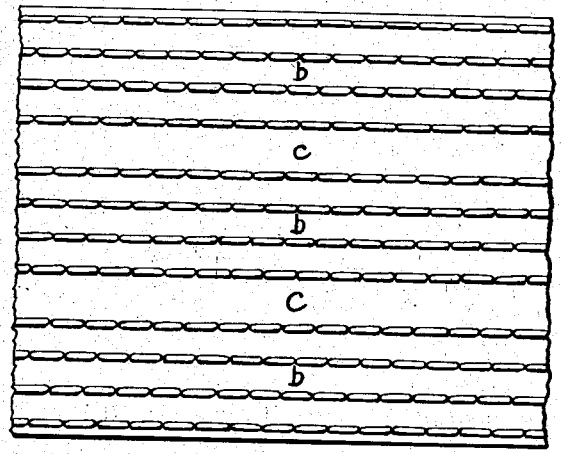
Fig.2. Fig.3.
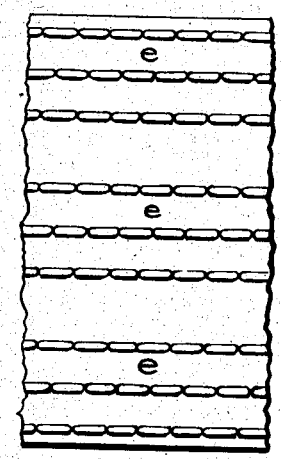
Fig.4.
Witnesses
Stuart Hilder.
George M. Anderson.
Inventor
Dudley E. Jones
By E. W. Anderson
his Attorney

UNITED STATES PATENT OFFICE.

DUDLEY E. JONES, OF LITTLE ROCK, ARKANSAS.

MACHINE-BELTING.

No. 839,001.　　　Specification of Letters Patent.　　　Patented Dec. 18, 1906.

Application filed December 21, 1905. Serial No. 292,848.

*To all whom it may concern:*

Be it known that I, DUDLEY E. JONES, a citizen of the United States, and a resident of Little Rock, in the county of Pulaski and State of Arkansas, have made a certain new and useful Invention in Machine-Belting; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a plan view of a section of four-ply belting embodying my invention. Fig. 2 is a longitudinal section of a portion of my belt. Fig. 3 is a view similar to Fig. 1 of a section of three-ply belting. Fig. 4 is a longitudinal section of the same.

The invention relates to belting which is made in layers of canvas or other stout textile material; and it consists in a device whereby the number of layers of which the belting is composed is indicated in a continuous manner throughout the length of the belting.

Belting of the character to which this invention applies consists of several layers or plies of the canvas fastened together by means of continuous longitudinal parallel rows of stitching and finished by treatment with pigment and compression in such a manner that it becomes for all practical purposes a single band admirably adapted to the purposes of machine-belting and having a solid appearance. The lines of stitching are, however, superficially apparent because of their strong thread and indicate that the belting is made of layers of canvas. It is important that the number of layers or plies of which a piece of such belting is composed shall be plainly indicated in order that its exact strength may be readily known, and this is a matter which in ordinary canvas belting can only be ascertained with considerable difficulty by cutting into the belting and separating the plies, and thus injuring a portion of it. The ordinary marking on a part or end of the piece of belting may be defaced or the marked part may have been cut off, leaving no clue of positive nature.

My device consists in providing the belting with groups of rows of continuous stitching, such groups being parallel and consisting each of a number of equidistant rows of stitching which is the same as the number of plies or layers in the belt. The ply-mark groups are separated from each other by intervals which are wider or narrower than the intervals between the rows of stitching of each of such groups, so that any one can tell at a glance from the number of rows in a group how many layers or plies there are in the belting. In a three-ply belt the groups will consist of three rows of stitching equally separated from each other, said groups being separated by wider or narrower intervals than those between the rows of a group.

In the drawings the letter *a* indicates a piece of four-ply belting, having four row groups *b*, separated by intervals *c*, and *d* represents a piece of three-ply belting, whose groups *e* consist each of three rows of stitching, and so on to any number of plies. This ply-mark, extending throughout the length of the belting and formed by a necessary element of its construction, is available in every portion of the band on both sides and as it does not add to the expense of manufacture nor injure the belt is designed to serve the purposes of such a mark in a very convenient and effective manner.

It is preferred to indicate the number of plies by means of longitudinal groups of rows of stitching of the same number, such groups being separated by intervals of different width than those between the rows of stitching; but it is evident that the number of plies may be indicated in a single row of stitching by separating the stitches of such row into groups of two, three, or more stitches, as the case may be.

Having thus described my invention, what I claim as new, and desire to secure by Letters Patent, is—

1. In machine-belting, the combination with a belt consisting of a plurality of layers of canvas, of ply-indicating means for uniting said layers.

2. In machine-belting, the combination with a belt consisting of a plurality of consolidated layers of canvas, of ply-indicating groups of stitching extending longitudinally and continuously throughout the belting.

3. In machine-belting, the combination with a belt consisting of a plurality of consolidated layers of canvas, of ply-indicating means for uniting said layers consisting of a number of groups of rows of continuous stitching equal to the number of layers in the belting.

In testimony whereof I affix my signature in presence of two witnesses.

DUDLEY E. JONES.

Witnesses:
E. V. OLSON,
F. W. CHAMBERS.